US009205943B2

(12) United States Patent
Chen (10) Patent No.: US 9,205,943 B2
(45) Date of Patent: Dec. 8, 2015

(54) FEEDING DEVICE (71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wen-Sheng Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 14/093,043

(22) Filed: Nov. 29, 2013

(65) Prior Publication Data

US 2014/0161573 A1 Jun. 12, 2014

(30) Foreign Application Priority Data

Dec. 7, 2012 (CN) .......................... 2012 1 0522008

(51) Int. Cl.
*B65G 65/04* (2006.01)
*B65B 69/00* (2006.01)
*B65H 1/30* (2006.01)
*B65G 59/08* (2006.01)

(52) U.S. Cl.
CPC ................ *B65B 69/00* (2013.01); *B65G 59/08* (2013.01); *B65H 1/30* (2013.01); *B65H 2301/422542* (2013.01)

(58) Field of Classification Search
CPC ...................... B65B 69/00; B65H 1/30; B65H 2301/422542; B65G 65/23; B65G 2814/0317; B65G 59/08

USPC ................ 414/414, 419, 421, 425, 405, 403, 414/416.04, 418, 420, 795.8, 795.81; 198/540, 541; 222/165, 166; 221/10, 221/11, 209; 451/333, 334, 335, 339; 193/16, 17, 25 AC
See application file for complete search history.

(56) References Cited

U.S. PATENT DOCUMENTS

| 1,498,732 | A | * | 6/1924 | Jauch ............................ 221/226 |
| 3,616,951 | A | * | 11/1971 | St. Clari et al. .......... 414/416.09 |
| 4,527,685 | A | * | 7/1985 | Welder ........................ 198/346.2 |
| 4,776,742 | A | * | 10/1988 | Felder ......................... 414/796.7 |
| 5,271,710 | A | * | 12/1993 | Decharran et al. ......... 414/798.9 |
| 2001/0012482 | A1 | * | 8/2001 | Vezina .......................... 414/419 |

* cited by examiner

*Primary Examiner* — Saul Rodriguez
*Assistant Examiner* — Mark Hageman
(74) *Attorney, Agent, or Firm* — Novak Druce Connolly Bove + Quigg LLP (57) ABSTRACT A feeding device includes a support assembly, a holding plate rotatably mounted on the support assembly, a guiding member mounted on the holding plate, a pushing mechanism, and a first unloading mechanism. The holding plate defines an unloading groove. The guiding member defines an outlet corresponding to the unloading groove. The pushing mechanism includes a first driver and a pushing member connected to the first driver. The pushing member is positioned above the holding plate. The first driver drives the pushing member to move towards the unloading groove. The first unloading mechanism includes a blocking member for blocking the unloading groove, and a second driver connected to the blocking member. The second driver drives the blocking member to move away from the unloading groove.

19 Claims, 6 Drawing Sheets

FEEDING DEVICE

BACKGROUND

1. Technical Field

The present disclosure relates to feeding devices, and particularly to a feeding device for automatically feeding workpieces.

2. Description of Related Art

Workpieces may be received in a packing or packaging member, such as a packing or packaging tube, to protect the workpieces from damage during transport. However, when the workpieces are transported to a place for machining or assembling, the workpieces need to be removed from the packing members by hand, which is inefficient and wastes a lot of time.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
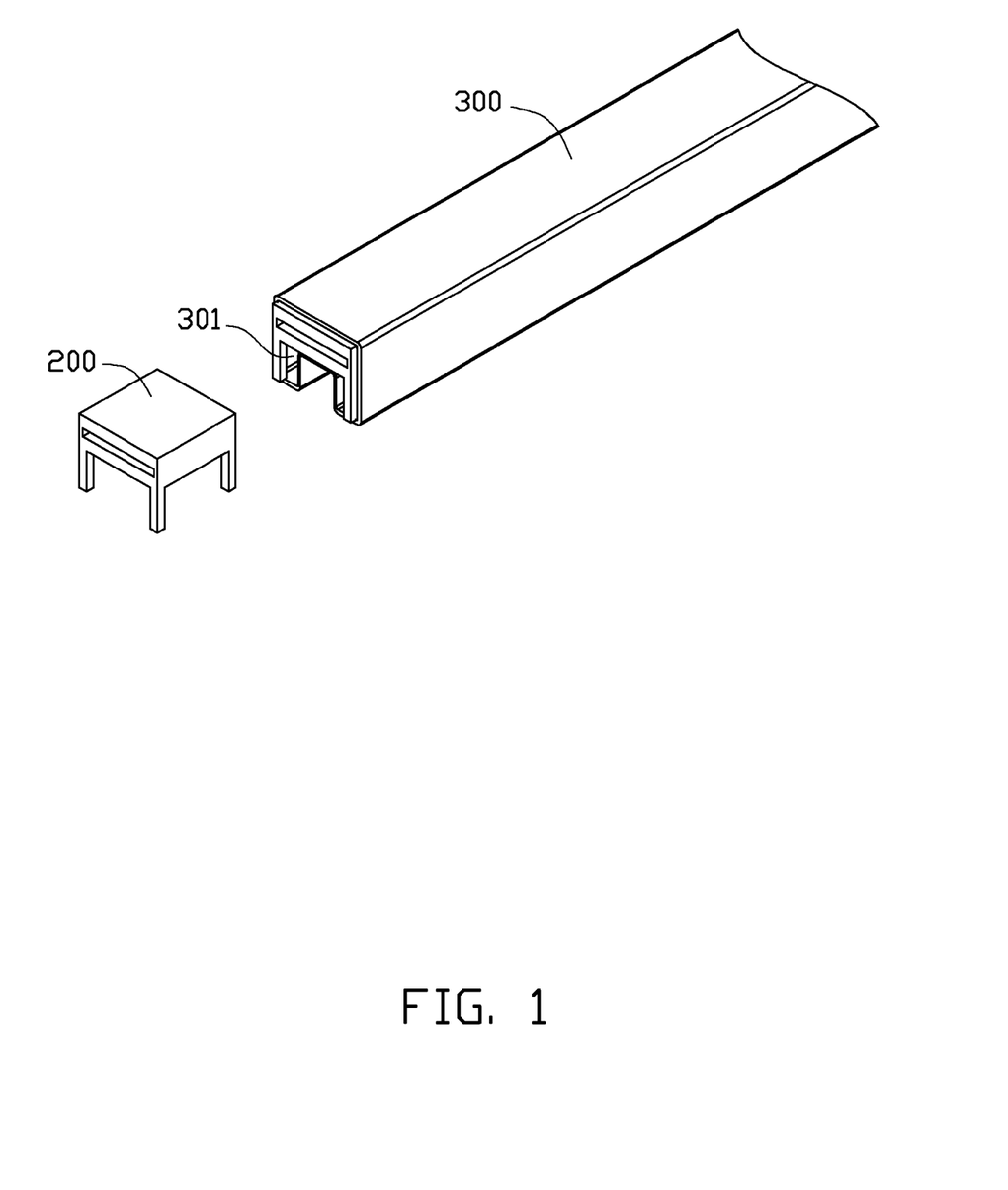
FIG. 1 is a partial, isometric view of an embodiment of workpieces and a packing member for receiving the workpieces.
Figure 2:
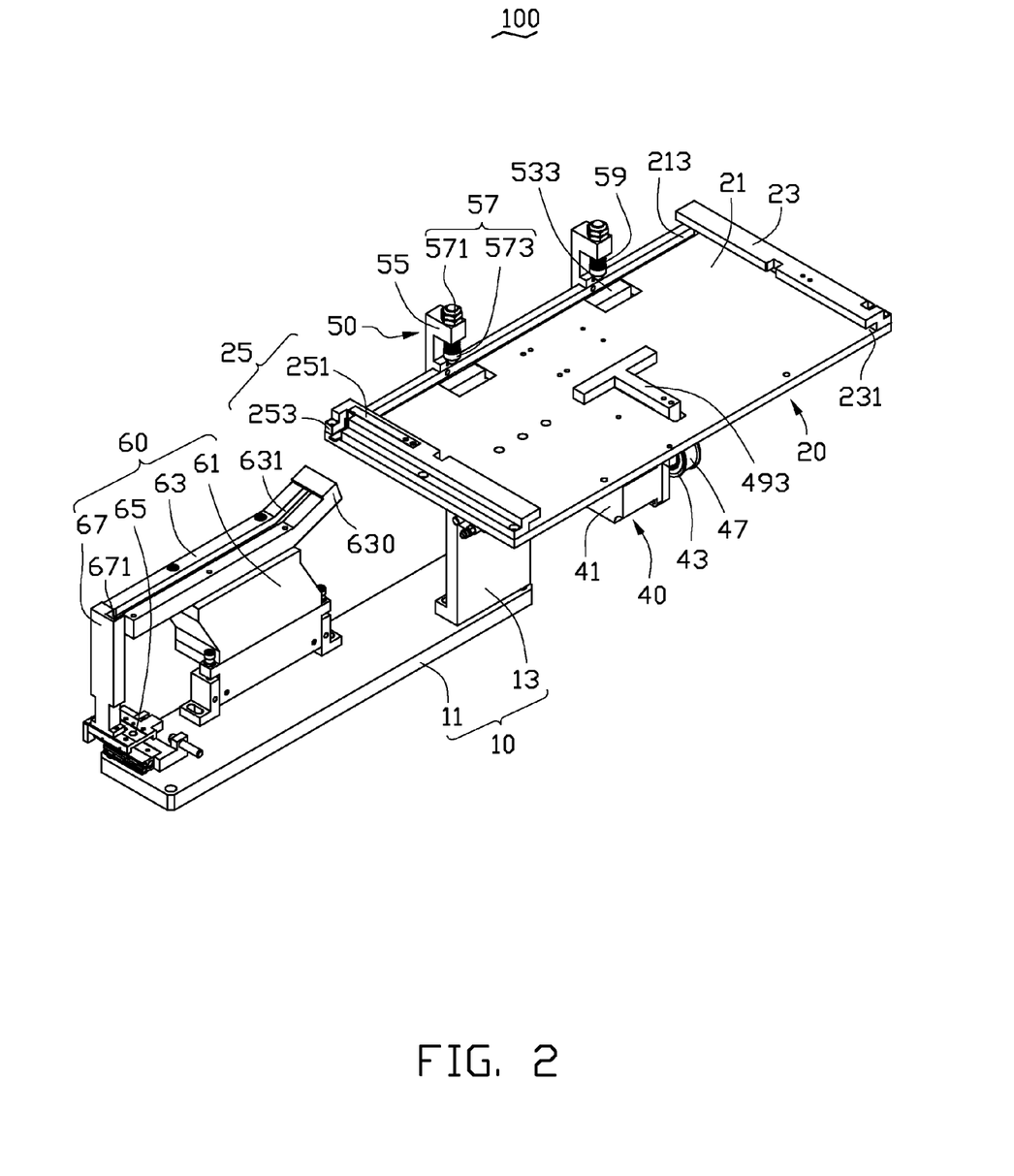
FIG. 2 is an isometric view of an embodiment of a feeding device.
Figure 3:
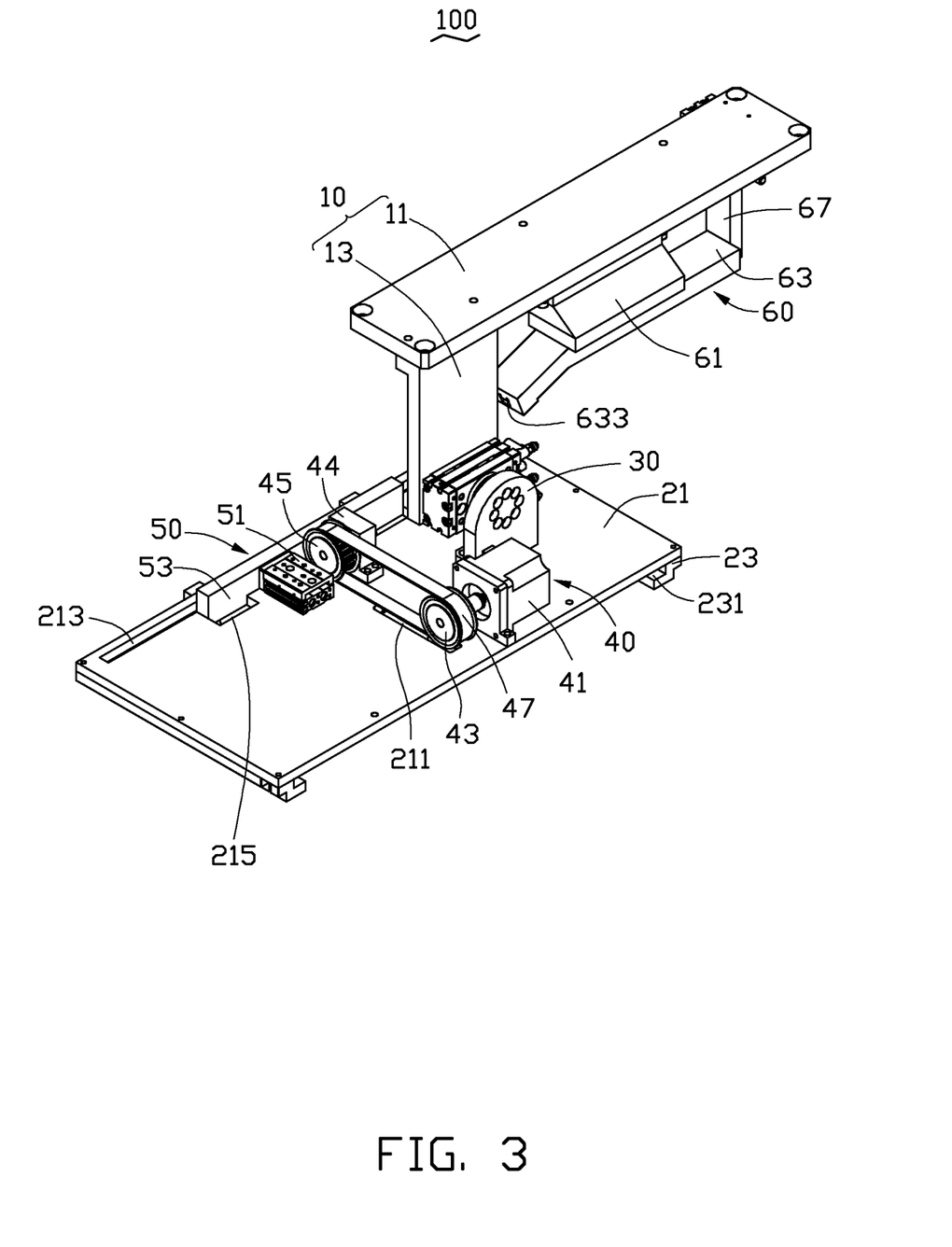
FIG. 3 is similar to FIG. 2, but viewed from another aspect.

FIGS. 1 through 3 show one embodiment of a feeding device 100 used and configured for separating a plurality of workpieces 200 from a packing member 300. The workpieces 200 are originally received in the packing member 300. The feeding device 100 includes a support assembly 10, a holding assembly 20, a rotation mechanism 30, a pushing mechanism 40, a first unloading mechanism 50, and a second unloading mechanism 60. The holding assembly 20 is rotatably-mounted to the support assembly 10 by the rotation mechanism 30. The second unloading mechanism 60 is mounted on the support assembly 10 and located adjacent to the holding assembly 20. The holding assembly 20 is configured to be disposed higher than the second unloading mechanism 60. The pushing mechanism 40 and the first unloading mechanism 50 are mounted to the holding assembly 20.

The holding assembly 20 is configured to hold a plurality of packing members 300 and a plurality of workpieces 200 received in the plurality of packing members 300. The pushing mechanism 40 is configured to push the plurality of packing members 300 to move on the holding assembly 20. The rotation mechanism 30 is configured to rotate the holding assembly 20. The second unloading mechanism 60 cooperates with the holding assembly 20 and the rotation mechanism 30 to separate the workpieces 200 from the corresponding packing members 300 and to transport the workpieces 200. The first unloading mechanism 50 is configured to unload one packing member 300 from the holding assembly 200 when the workpieces 200 are separated from the one packing member 300. In one embodiment, the one packing member 300 is substantially bar-shaped and defines a receiving groove 301 along a longitudinal direction thereof. The workpieces 200 are received in the receiving groove 301 of the one corresponding packing member 300.

Figure 4:
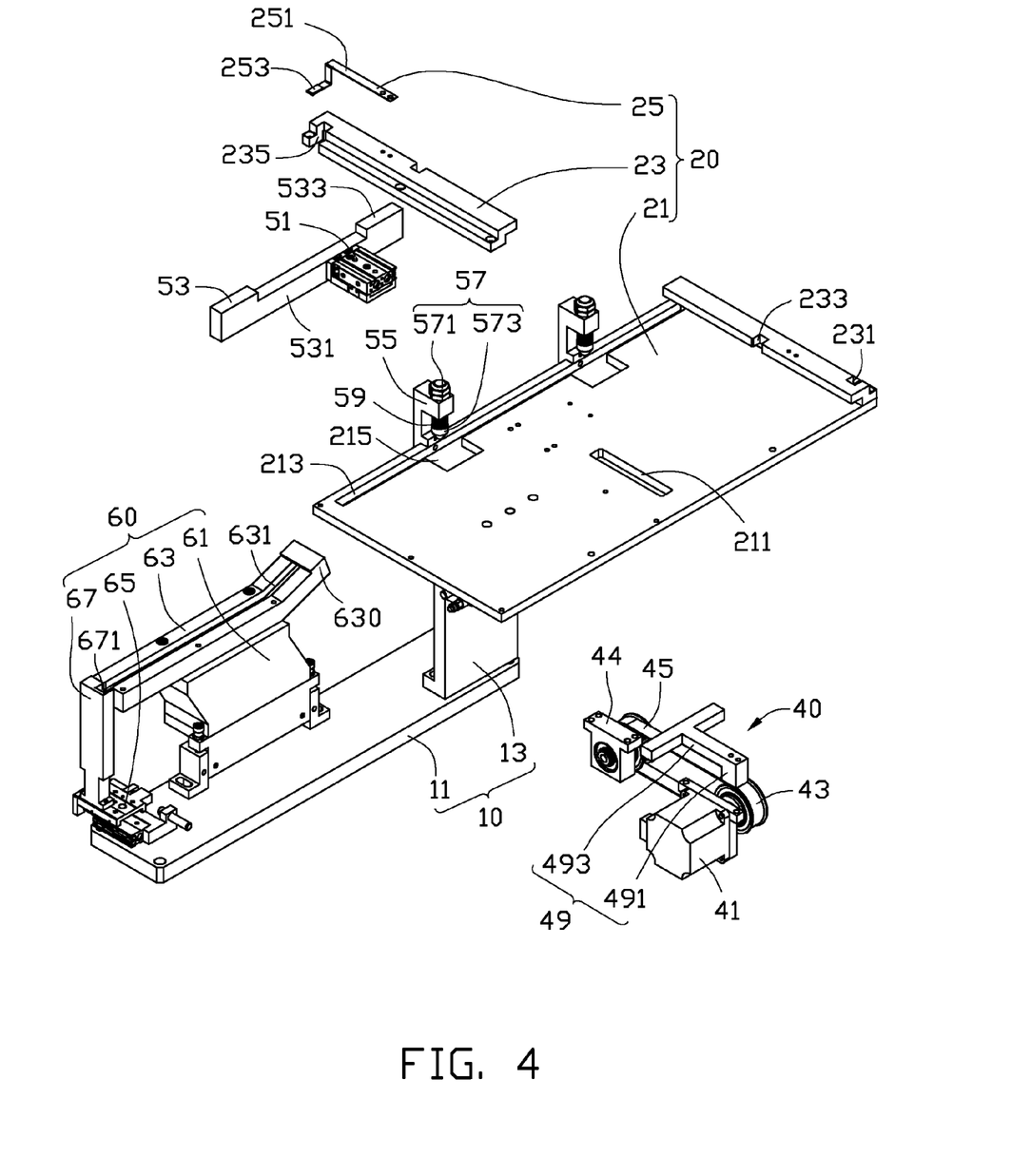
FIG. 4 is an exploded, isometric view of the feeding device shown in FIG. 2.

FIG. 4 shows that the support assembly 10 includes a mounting plate 11 and a support plate 13 fixed substantially perpendicularly at an end portion of the mounting plate 11. The holding assembly 20 includes a holding plate 21, a pair of guiding members 23, and an elastic member 25. The holding plate 21 is rotatably mounted on the support plate 13 by the rotation mechanism 30. In an original usage state, the holding plate 21 is substantially parallel to the mounting plate 11. The pair of guiding members 23 are located at opposite ends of the holding plate 21, respectively, and are substantially parallel to each other. The elastic member 25 is elastically latched with one of the pair of guiding members 23. In the illustrated embodiment, the rotation mechanism 30 is a rotation cylinder. The rotation mechanism 30 rotates the holding plate 21 to configure the holding plate 21 at an incline relative to the mounting plate 11.

The holding plate 21 is substantially rectangular and configured to support the plurality of packing members 300. The holding plate 21 defines a substantially bar-shaped through groove 211 along a widthwise direction thereof. The holding plate 21 further defines an unloading groove 213 along a longitudinal direction thereof and adjacent to an edge thereof, for unloading the packing member 300, and defines two accepting grooves 215 communicating with the unloading groove 213, respectively. The accepting grooves 215 are positioned between the unloading groove 213 and the through groove 211, and are arranged at regular intervals.

A cross-section of each of the guiding members 23 is substantially Z-shaped. Each guiding member 23 is substantially parallel to the through groove 211. Each of the guiding members 23 defines a guiding groove 231 along a longitudinal direction thereof. The guiding grooves 231 of the guiding members 23 face each other and are substantially parallel to the through groove 211. Each of the guiding members 23 further defines a loading groove 233 in a substantially middle portion thereof. An imaginary line connecting the loading grooves 233 of the pair of guiding members 23 is substantially perpendicular to the through groove 211. The guiding member 23 adjacent to the second unloading mechanism 60 defines an outlet 235 in an end portion thereof adjacent to the unloading groove 213, and the outlet 235 communicates with the corresponding guiding groove 231.

The elastic member 25 includes a fixing portion 251 and a bending portion 253. The bending portion 253 is substantially L-shaped and is connected to a distal end of the fixing portion 251. An end of the fixing portion 251 away from the bending portion 253 is fixed to the corresponding guiding member 23. The bending portion 253 is received in the outlet 235 of the corresponding guiding member 23.

The pushing mechanism 40 includes a first driver 41, a first pulley 43, a fixing block 44, a second pulley 45, a transmission belt 47, and a pushing member 49. The first driver 41 is located at a side surface of the holding plate 21 facing the support plate 13. The first pulley 43 is mounted on a driving shaft of the first driver 41. The first driver 41 drives the first pulley 43 to rotate. The fixing block 44 is fixed to the side surface of the holding plate 21 facing the support plate 13, and is located adjacent to the first driver 41. The second pulley 45 is mounted to the fixing block 44. The transmission belt 47 winds around the first pulley 43 and the second pulley 45, respectively. The pushing member 49 includes a fixing end 491 and a pushing end 493 connected to the fixing end 491. The fixing end 491 is substantially perpendicular and connected to the transmission belt 47, and is received through the through groove 211 of the holding plate 21. The pushing end 493 is substantially T-shaped and extends substantially perpendicularly from the fixing end 491 towards the second pulley 45. The pushing end 493 is located above the holding plate 21 and moves along the through groove 211 to push the packing members 300.

The first unloading mechanism 50 includes a second driver 51, a blocking member 53, a pair of mounting blocks 55, a pair of resisting members 57, and a pair of elastic members 59. The second driver 51 is mounted on the side surface of the holding plate 21 facing the support plate 13, and is located between the unloading groove 213 and the through groove 211. The blocking member 53 is substantially bar-shaped and connected to a driving end of the second driver 51. The second driver 51 drives the blocking member 53 to cover a portion of the unloading groove 213. The blocking member 53 includes a base body 531 connected to the second driver 51 and two stop portions 533 protruding from the base body 531. The stop portions 533 are received in the accepting grooves 215, respectively. When the second driver 51 drives the base body 531, the stop portions 533 moves from the accepting grooves 215 to the unloading groove 213, thereby having the stop portions 533 covering a portion of the unloading groove 213.

The pair of mounting blocks 55 is arranged on an edge of the holding plate 21 adjacent to the unloading groove 213. The pair of resisting members 57 is respectively mounted on the pair of mounting blocks 55 and positioned above the unloading groove 213. Each of the pair of resisting members 57 includes a main body 571 and a conical portion 573 connected to the main body 571. The main body 571 is substantially cylindrical, movably received in the corresponding mounting block 55, and substantially perpendicular to the holding plate 21. The conical portion 573 is formed at an end of the main body 571 adjacent to the holding plate 21. The pair of elastic members 59 is respectively sleeved on the main body 571 of the pair of resisting members 57. Each elastic member 59 resists the corresponding mounting block 55 and the corresponding conical portion 573.

The second unloading mechanism 60 includes an unloading member 61, a first conveying member 63, a third driver 65, and a second conveying member 67. The unloading member 61 is mounted on the mounting plate 11 and located adjacent to the support plate 13. In the illustrated embodiment, the unloading member 61 is a vibrating apparatus. The first conveying member 63 is fixed on the unloading member 61, and an end portion 630 of the first conveying member 63 adjacent to the holding plate 21 extends towards the holding plate 21, and is inclined relative to the holding plate 21. The first conveying member 63 is lower than the holding plate 21. A conveying groove 631 is defined in a top surface of the first conveying member 63, and a matching opening 633 is defined in an end of the first conveying member 63 adjacent to the holding plate 21. The matching opening 633 communicates with the conveying groove 631, so that the workpieces 200 separated from the packing member 300 are conveyed to the conveying groove 631 via the matching opening 633. The third driver 65 is mounted on the mounting plate 11 and located at a side of the unloading member 61 away from the holding plate 21. The second conveying member 67 is substantially cubic and connected to a driving end of the third driver 65. The second conveying member 67 defines a matching groove 671 at a side surface adjacent to the first conveying member 63. The third driver 65 drives the second conveying member 67 to move substantially perpendicularly to the conveying groove 631, to convey the workpieces 200 one at a time or one-by-one in the conveying groove 631 to a next process.

Figure 5:
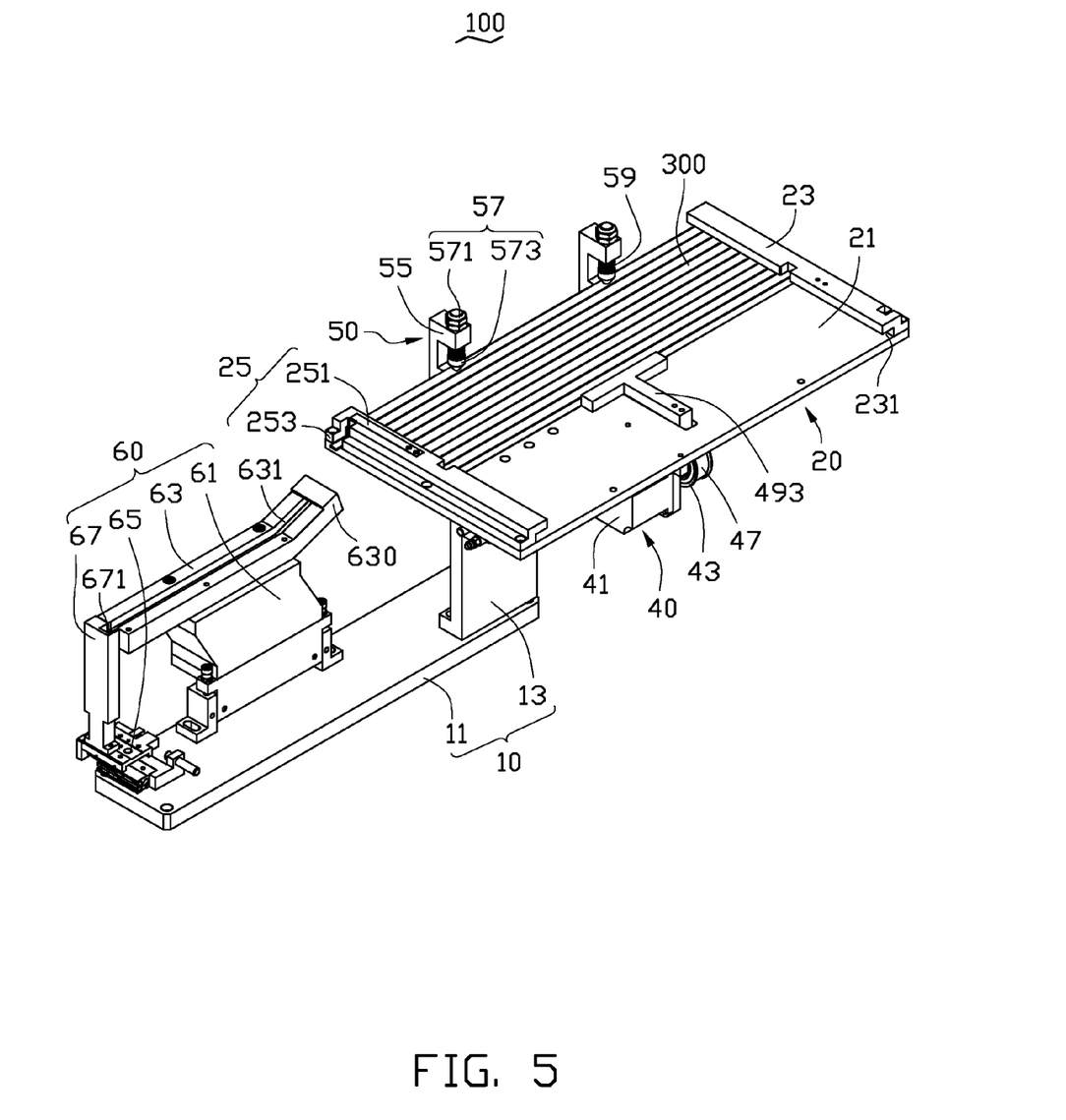
FIG. 5 is an original state of the feeding device shown in FIG. 2.

Referring to FIG. 5, in use, the plurality of workpieces 200 are packed and received in the receiving grooves 301 of the packing members 300. The packing members 300 are loaded onto the holding plate 21 from the loading groove 233 and slid along the guiding groove 231 when pushed by the pushing end 493 to be side-by-side on the holding plate 21. The second driver 51 drives the stop portions 533 to block the unloading groove 213, and one packing member 300 abuts a bottom portion of the mounting blocks 55. The packing member 300 that abuts the mounting blocks 55 is configured to be over the unloading groove 213 and resists the conical portions 573 of the pair of resisting members 57, such that the pair of resisting members 57 are moved away from the holding plate 21 and the pair of elastic members 59 are compressed. Thus, the conical portions 573 resist the corresponding packing member 300.

Figure 6:
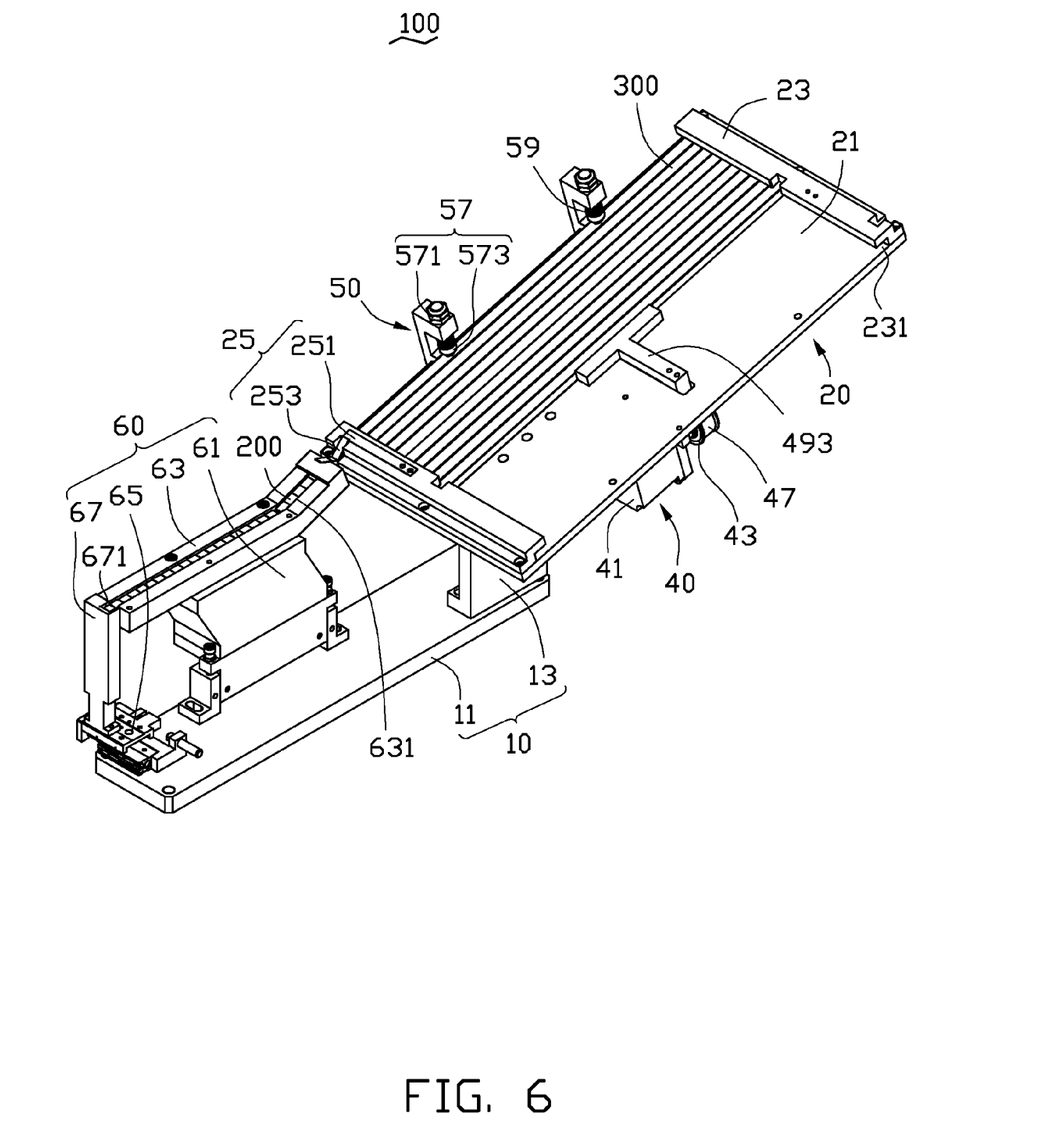
FIG. 6 is a second state of the feeding device shown in FIG. 2.

After the packing members 300 are loaded onto the holding plate 21, the rotation mechanism 30 rotates the holding plate 21 along a first direction until the end portion 630 of the first conveying member 63 resists the bending portion 253 of the elastic member 25. The elastic member 25 is deformed to allow the outlet 235 to join and communicate with the matching opening 633. The workpieces 200 slide out from the packing members 300 one-by-one to be received in the conveying groove 631 of the first conveying member 63 via the outlet 235 and the matching opening 633. The unloading member 61 vibrates to assist the workpieces 200 to slide along the conveying groove 631 and reach the matching groove 671 of the second conveying member 67. The second conveying member 67 conveys the workpieces 200 in the matching groove 671 to a next process driven by the third driver 65. Thus, the feeding device 100 is in a second usage state (shown in FIG. 6).

When all of the workpieces 200 are separated from the packing member 300 resisted by the conical portions 573, the rotation mechanism 30 rotates the holding plate 21 along a second direction opposite to the first direction to return or revert the holding plate 21 to a position in the original usage state. The second driver 51 drives the blocking member 53 to move towards the through groove 211, such that the stop portions 533 of the blocking member 53 are received in the accepting grooves 215 and do not block the unloading groove 213. The packing member 300 abutting the mounting blocks 55 drops from the unloading groove 213, and the second driver 51 drives the blocking members 53 to block the unloading groove 213 again. Then, the first driver 41 rotates the second pulley 45 via the first pulley 43 and the transmission belt 47, thereby moving the pushing member 49 towards the pair of resisting members 57. The pushing member 49 pushes the packing members 300 toward the pair of resisting members 57, and then a next packing member 300 resists the pair of resisting members 57. The feeding device 100 repeats the above-mentioned process to separate the workpieces 200 from the corresponding packing members 300.

In an alternative embodiment, a number of the guiding members 23 can be one, and the guiding member 23 is positioned at an end of the holding plate 21 adjacent to the second unloading mechanism 60. When a rotation angle of the rotation mechanism 30 is small, the elastic member 25 can be omitted. The first pulley 43, the transmission belt 47, and the second pulley 45 can be omitted, such that the first driver 41 is directly connected to the pushing member 49 to move the pushing member 49 directly. The mounting blocks 55, the resisting members 57, and the elastic members 59 can be omitted, such that the packing members 300 drop from the unloading groove 213 without the assisted resilient force exerted by the elastic members 59. The second conveying member 67 and the third driver 65 can be omitted, such that the first conveying member 63 directly conveys the workpieces 200 to a next process. The unloading member 61 can be omitted, such that the workpieces 200 are conveyed through the first conveying member 63 without the assisted vibrating force.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A feeding device, for separating a plurality of workpieces from a packing member, the workpieces being received in the packing member, the feeding device comprising:
   a support assembly;
   a rotation mechanism mounted on the support assembly;
   a holding plate mounted on the rotation mechanism and defining an unloading groove;
   a guiding member mounted on the holding plate, and defining an outlet corresponding to the unloading groove of the holding plate;
   a pushing mechanism comprising a first driver and a pushing member connected to the first driver, the pushing member positioned above the holding plate, the first driver capable of driving the pushing member to move towards the unloading groove;
   a first unloading mechanism comprising a blocking member and a second driver connected to the blocking member, the second driver capable of driving the blocking member to cover a portion of the unloading groove; and
   a second unloading mechanism comprising a first conveying member mounted on the support assembly, the first conveying member positioned below the holding plate, the first conveying member defining a matching opening and a conveying groove communicating with the matching opening, the guiding member positioned adjacent to the matching opening, the outlet in the guiding member corresponding to the matching opening,
   wherein, when in use, the packing members are loaded to the holding plate, the first driver drives the pushing member to push the packing members until being positioned above the unloading groove, the rotation mechanism rotates the holding plate, so that the holding plate is inclined relative to the support assembly, the outlet communicates with the matching opening, the plurality of workpieces received in the packing member are moved to the conveying groove via the outlet and the matching opening; when the packing member is empty, the rotation mechanism rotates the holding plate to revert back to an original usage state, the second driver drives the blocking member to move away from the unloading groove, the packing member drops down from the unloading groove.

2. The feeding device of claim 1, wherein the guiding member further defines a guiding groove and a loading groove communicating with the guiding groove, the guiding groove communicates with the outlet.

3. The feeding device of claim 1 further comprising an elastic member, wherein the elastic member comprises a fixing portion and a bending portion extending from the fixing portion, the fixing portion is fixed on the guiding member, the bending portion is elastically latched in the outlet, to block the outlet.

4. The feeding device of claim 1, wherein the pushing mechanism further comprises a fixing block, a first pulley, a second pulley, and a transmission belt, the fixing block is mounted on the holding plate, the first pulley is connected to the first driver, the second pulley is mounted on the fixing block, the transmission belt winds around the first pulley and the second pulley, respectively, the pushing member is mounted on the transmission belt.

5. The feeding device of claim 4, wherein the holding plate defines a through groove substantially perpendicular to the unloading groove, the pushing member comprises a fixing end and a pushing end connected to the fixing end, the fixing end is connected to the transmission belt, the pushing end is inserted through the through groove, and positioned above the holding plate, the first driver is capable of driving the pushing end to move along the through groove.

6. The feeding device of claim 1, wherein the first unloading mechanism further comprising a mounting block, a resisting member, and an elastic member, the mounting block is mounted at an edge of the holding plate adjacent to the unloading groove, the resisting member is movably inserted into the mounting block, and is positioned above the holding plate, the elastic member of the first unloading mechanism is sleeved on the resisting member.

7. The feeding device of claim 6, wherein the resisting member comprises a main body and a conical portion connected to the main body, the main body is movably mounted on the mounting block, the conical portion is positioned at an end of the main body adjacent to the holding plate, the elastic member is sleeved on the main body.

8. The feeding device of claim 1, wherein the second unloading mechanism further comprises an unloading member, a third driver, and a second conveying member, the unloading member is mounted on the support assembly, the first conveying member is positioned on the unloading member, and an end portion of the first conveying member is inclined relative to the holding plate, the third driver is mounted on the support assembly, the second conveying member is connected to the third driver, the second conveying member defines a matching groove communicating with the conveying groove, the third driver is capable of moving the second conveying member.

9. The feeding device of claim 1, wherein the support assembly comprising a mounting plate and a support plate substantially perpendicularly positioned on the mounting plate, the holding plate is positioned on the support plate by the rotation mechanism, the first conveying member is positioned on the mounting plate.

10. The feeding device of claim 1, wherein the blocking member comprises a base body connected to the second driver and at least one stop portion extending from the base body, the holding plate further defines at least one accepting groove communicating with the unloading groove, the at least one stop portion is received in the at least one accepting groove, the second driver is capable of driving the at least one stop portion to cover a portion of the unloading groove.

11. A feeding device, comprising:
    a support assembly;

a holding plate rotatably mounted on the support assembly, and defining an unloading groove;

a guiding member mounted on the holding plate, and defining an outlet corresponding to the unloading groove of the holding plate;

a pushing mechanism comprising a first driver and a pushing member connected to the first driver, the pushing member positioned above the holding plate, the first driver capable of driving the pushing member to move towards the unloading groove;

a first unloading mechanism comprising a blocking member and a second driver connected to the blocking member, the second driver capable of driving the blocking member to block a portion of the unloading groove; and a second unloading mechanism comprising a first conveying member mounted on the support assembly, the first conveying member positioned below the holding plate, the first conveying member defining a matching opening and a conveying groove communicating with the matching opening, the guiding member positioned adjacent to the matching opening, the outlet in the guiding member corresponding to the matching opening.

12. The feeding device of claim 11, wherein the blocking member comprises a base body connected to the second driver and at least one stop portion extending from the base body, the holding plate further defines at least one accepting groove communicating with the unloading groove, the at least one stop portion is received in the at least one accepting groove, the second driver is capable of driving the at least one stop portion to cover a portion of the unloading groove.

13. A feeding device, comprising:

a support assembly;

a holding plate rotatably mounted on the support assembly, and defining an unloading groove;

a guiding member mounted on the holding plate, and defining an outlet corresponding to the unloading groove;

an elastic member comprising a fixing portion and a bending portion extending from the fixing portion, the fixing portion fixed on the guiding member, the bending portion elastically latched in the outlet, to block the outlet;

a pushing mechanism comprising a first driver and a pushing member connected to the first driver, the pushing member positioned above the holding plate, the first driver capable of driving the pushing member to move towards the unloading groove; and a first unloading mechanism comprising a blocking member and a second driver connected to the blocking member, the second driver capable of driving the blocking member to cover a portion of the unloading groove.

14. The feeding device of claim 13, wherein the guiding member further defines a guiding groove and a loading groove communicating with the guiding groove, the guiding groove communicates with the outlet.

15. The feeding device of claim 13, wherein the pushing mechanism further comprises a fixing block, a first pulley, a second pulley, and a transmission belt, the fixing block is mounted on the holding plate, the first pulley is connected to the first driver, the second pulley is mounted on the fixing block, the transmission belt winds around the first pulley and the second pulley, respectively, the pushing member is mounted on the transmission belt.

16. The feeding device of claim 15, wherein the holding plate defines a through groove substantially perpendicular to the unloading groove, the pushing member comprises a fixing end and a pushing end connected to the fixing end, the fixing end is connected to the transmission belt, the pushing end is inserted through the through groove, and positioned above the holding plate, the first driver is capable of driving the pushing end to move along the through groove.

17. The feeding device of claim 13, wherein the first unloading mechanism further comprising a mounting block, a resisting member, and an elastic member, the mounting block is mounted at an edge of the holding plate adjacent to the unloading groove, the resisting member is movably inserted into the mounting block, and is positioned above the holding plate, the elastic member of the first unloading mechanism is sleeved on the resisting member.

18. The feeding device of claim 17, wherein the resisting member comprises a main body and a conical portion connected to the main body, the main body is movably mounted on the mounting block, the conical portion is positioned at an end of the main body adjacent to the holding plate, the elastic member is sleeved on the main body.

19. The feeding device of claim 13 further comprising a second unloading mechanism, wherein the second unloading mechanism comprises an unloading member, a first conveying member, a third driver, and a second conveying member, the unloading member is mounted on the support assembly, the first conveying member is positioned on the unloading member, and an end portion of the first conveying member extends towards the holding plate, the third driver is mounted on the support assembly, the second conveying member is connected to the third driver, the second conveying member defines a matching groove communicating with the conveying groove, the third driver is capable of moving the second conveying member.

* * * * *